United States Patent [19]

Wang et al.

[11] Patent Number: 4,651,325
[45] Date of Patent: Mar. 17, 1987

[54] RF-PUMPED INFRARED LASER USING TRANSVERSE GAS FLOW

[75] Inventors: John H. S. Wang, Rancho Palos Verdes, Calif.; Joseph N. Paranto, Albuquerque, N. Mex.; Christopher M. Lovejoy, Inglewood, Calif.

[73] Assignee: Hughes Aircraft Company, Los Angeles, Calif.

[21] Appl. No.: 470,409

[22] Filed: Feb. 28, 1983

[51] Int. Cl.⁴ .............................................. H01S 3/097
[52] U.S. Cl. ...................................... 372/82; 372/87; 372/64; 372/58
[58] Field of Search .................. 372/61, 69, 76, 82, 372/89, 90, 55, 64, 58, 59, 87, 34

[56] References Cited

U.S. PATENT DOCUMENTS

| | | | |
|---|---|---|---|
| 3,748,594 | 7/1973 | Pugh | 372/82 |
| 4,031,484 | 6/1977 | Freiberg et al. | 372/89 |
| 4,352,188 | 9/1982 | Griffith | 372/82 |
| 4,493,087 | 1/1985 | Laakman et al. | 372/82 |

FOREIGN PATENT DOCUMENTS 2919709 11/1980 Fed. Rep. of Germany ........ 372/87
0115276 6/1985 Japan .................................. 372/34

OTHER PUBLICATIONS

Nichols et al; "Radio-Frequency Preionization in a Supersonic Transverse Electrical Discharge Laser", *IEEE J. QE QE*, p. 718, Aug. 1972.
Lachambre et al; "A Transversely rf-Excited $CO_2$ Waveguide Laser"; *Appl. Phys. Lett.*, vol. 32, No. 10, May 15, 1978.

*Primary Examiner*—Leon Scott, Jr.
*Attorney, Agent, or Firm*—Ronald L. Taylor; A. W. Karambelas

[57] ABSTRACT

A transverse gas flow RF pumped waveguide laser has been developed utilizing RF discharge waveguide technology in several infrared lasers. Two potential applications have been identified; the pulsed chemical laser and the CW $CO_2$ laser. In the chemical laser, the flowing gas device provides rapid gas replenishment to maintain high electrical efficiency at high repetition rates. In the CW $CO_2$ laser, the flowing gas provides efficient cooling so that high output power per unit gain length can be achieved.

5 Claims, 10 Drawing Figures

| | WAVEGUIDE CONFIGURATION | | TRANSVERSE FLOW CONFIGURATION | |
|---|---|---|---|---|
| GAIN LENGTH | 20 CM | 50 CM | 20 CM | 50 CM |
| SMALL SIGNAL GAIN (PER CENTIMETER) | 0.008-0.01 | 0.008-0.01 | 0.008-0.01 | 0.008-0.01 |
| ELECTRICAL EFFICIENCY | 10% | (12%) | 10-11% | (12-15%) |
| POWER OUTPUT | 5-7 WATTS | (20-30 WATTS) | 16 WATTS | (62 WATTS) |
| OUTPUT POWER PER CM GAIN LENGTH | 0.3 W/CM | 0.4-0.6 W/CM | 0.8 W/CM | (1.25 W/CM) |

Fig. 8.

RF-PUMPED INFRARED LASER USING TRANSVERSE GAS FLOW

BACKGROUND OF THE INVENTION

Radio frequency discharge waveguide laser technology development by us has included 10.6µ (micron) wavelength $CO_2$ (carbon dioxide) gas, 2.7µ wavelength HF (hydrogen fluoride) gas, 3.8µ DF (deuterium fluoride) gas lasers. A maximum electrical efficiency of 5.3% and 4.0% for pulsed HF and DF gas chemical lasers, respectively, was demonstrated at a low repetition rate of 100 Hz. As the repetition rate increased, the efficiencies were decreased. Since the waveguide configuration utilizes longitudinal gas flow, the flow velocity is restricted by the small cross section of the waveguide bore; and, therefore, the gas replenishment rate in the waveguide is low.

For the CW (continuous wave) $CO_2$ laser, the advantage of the waveguide configuration is that it operates in a high pressure range of 50 to 150 torr to provide a broad frequency tunability. It has, however, a limited heat transfer capability which limits the maximum power loading per unit volume and the power output per unit value length. The typical gain is 0.3–0.6 watts per centimeter. It is suitable for a 1–10 watt laser with 10–50 cm gain length. For some applications requiring a $CO_2$ laser with power higher than 50 watts, such a waveguide laser would have a rather long gain length, normally longer than one meter.

SUMMARY OF THE INVENTION

The waveguide laser of this invention comprises a cavity defined by two metal electrodes with no side walls, and means for generating transverse gas flow of the lasing medium across the electrode. This provides a minimum pressure drop across the electrodes and, therefore, fast gas flow. This faster gas flow increases the laser gas replenishment rate necessary for high repetition HF/DF pulsed chemical lasers. This transverse gas flow device also allows efficient cooling of the laser medium and the electrodes for CW $CO_2$ laser so that higher laser output per unit gain length can be extracted.

BRIEF DESCRIPTION OF THE DRAWINGS

The invention is best understood by reference to the accompanying drawings, of which:

FIGS. 1a, b and c are schematic diagrams of the transverse flow RF-pumped laser configuration;

DETAILED DESCRIPTION OF THE INVENTION

Figures 1A, 1B:
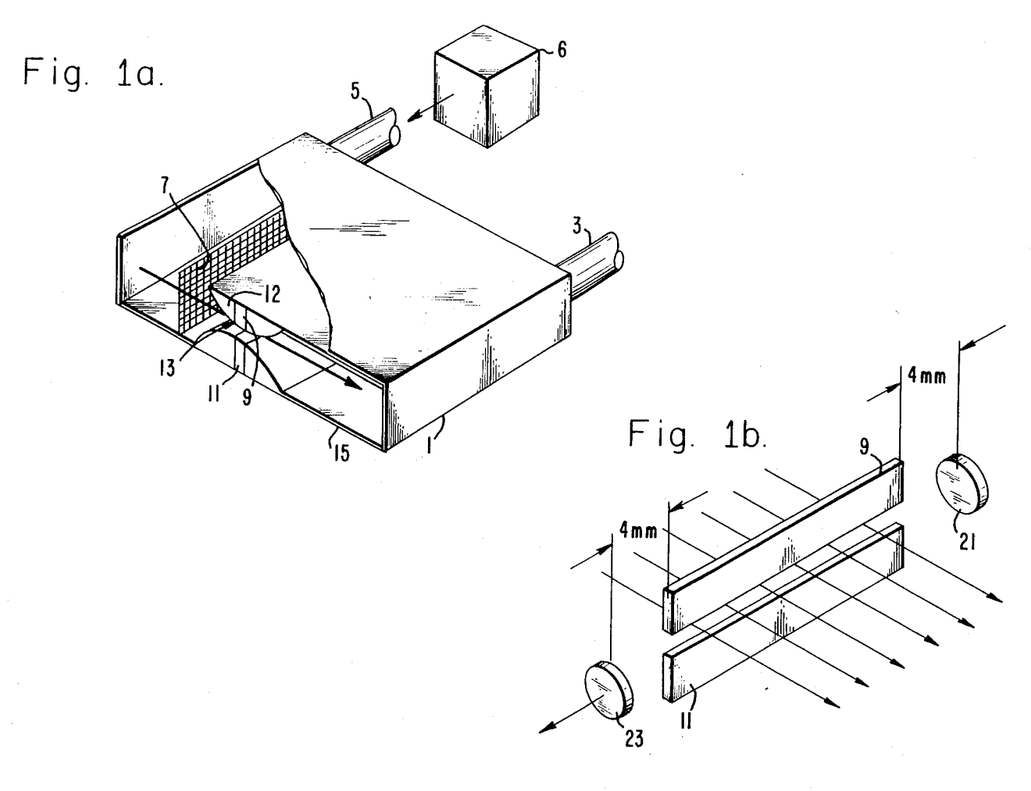

The transverse gas flow laser is illustrated in FIGS. 1a and b. The tested version consists of a solid aluminum body 1, of dimensions 9.0"×8.5"×2.25", having two 1" diameter ports 3, 5 for gas circulation connected to a gas recirculation pump 6. A stainless steel screen 7 is placed approximately 2" from RF excitation electrodes 9, 11 to provide uniform gas flow within the discharge region 13. The electrodes 9, 11 are 20 cm long and 2 mm wide; they are separated by 3 mm. The upper electrode 9 is set into a section of ceramic 12 providing insulation of the electrode from the aluminum body 1. The lower electrode 11 is attached to the laser body 15 to provide a common ground. The optics consist of a total reflector or mirror 21 and a partial reflector 23. The electrode faces are polished smooth to minimize diffractive and scattering losses. The optics are placed approximately 4 mm from the bore. This distance is chosen to be short enough to minimize the coupling loss but far enough apart to prevent discharge to the reflectors 21 and 23.

Figure 1C:
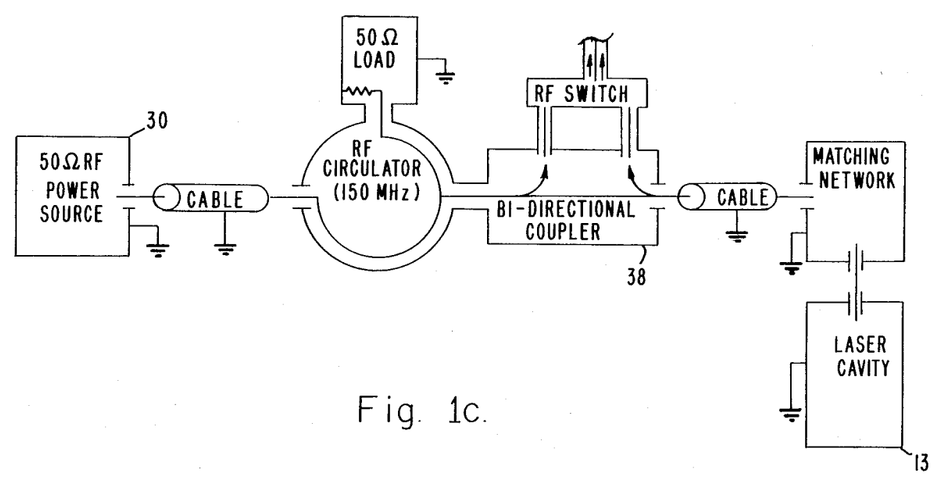

The electronic ciruit is illustrated in FIG. 1c and includes a 50 ohm RF power source 130 which operates with pulse lengths varied from 0.5 to 5µ sec and repetition rates up to 20,000 Hz. The maximum peak power is 6 kilowatts and the RF frequency range is 160 to 175 MHz. Energy is transmitted through a cable 132 to an RF circulator 134 having a 50 ohm load 136 attached, and thence to a bidirectional coupler 138. The bidirectional coupler 138 is used to monitor the forward and reflected pulses from the laser cavity 13 through a matching network 140 and an RF switch 142. The matching network 140 matches the inductance of the cavity 13 to the source 130 in order to achieve efficient power coupling into the laser medium. Although absorbed power in the gas was measured, all efficiencies quoted hereafter are referenced to the RF power from the power source 130. For CW operation, the bidirectional coupler 138 is eliminated and replaced by a Bird CW forward/reflecting power meter.

Experimental Results

With the tranverse flow configuration, we have demonstrated the pulsed 3.8µ DF and both the pulsed and CW 10.6µ $CO_2$ lasers. In the DF Chemical laser we achieved 4.0% electrical efficiency and we have also extended that high efficiency to high repetition rates resulting in 0.6 watt maximum output power. The CW 10.6µ $CO_2$ system demonstrated an output power of 16 watts due to efficient cooling of the electrodes and gas medium in the transverse flow device.

A. Pulsed Chemical HF and DF Laser

The transverse flow configuration increased the gas velocity due to the lower pressure drop across the electrodes. Because of the geometry of the system illustrated in FIG. 1, the gas replenishment rate is increased, and therefore the repetition rate of the chemical laser can be increased without substantial loss of efficiency. This increased flow rate allows a fresh mixture of gas in the discharge area for each pulse. For the purpose of direct comparison, the same vacuum system was used for both the previous conventional waveguide laser test results and the current transverse flow laser test results discussed in this specification. The increased flow rate of the transverse flow laser of this invention was a result of the lower pressure drop across the electrodes 9, 11.

Figure 8:
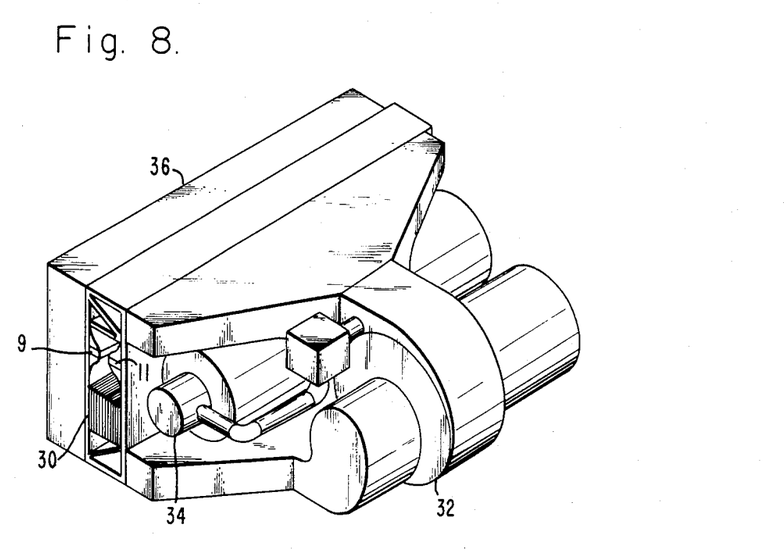
FIG. 8 illustrates a compact recirculating gas DF laser package.

For eventual application, a much faster gas flow can be achieved by recirculating the lasant gas. A design for such a recirculating gas laser is illustrated in FIG. 8. This design includes the electrodes 9, 11, of FIG. 1a, chemical scrubber and heat exchanger 30, a gas recirculator 32, a gas supply bottle 34 and a chassis 36 housing the RF power supply electronics. An increase in the gas replenishment rate should result in an order of magnitude improvement of laser power. However, a scrubber to eliminate the generated HF/DF molecules would be needed along with a small replenishment supply of $SF_6$ and $H_2$ or $D_2$. It is contemplated that the laser apparatus of FIG. 8 would be operated at an excitation pulse repetition rate of 2 KHz and yield 5 watts average power.

Figure 2:
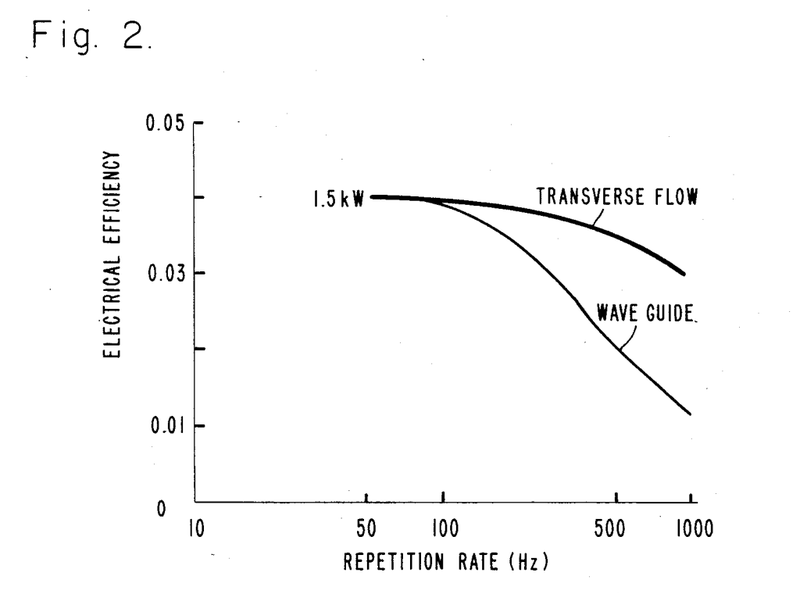
FIG. 2 is a graph illustrating the performance comparison between the transverse flow and the ordinary waveguide laser.
Figure 3:
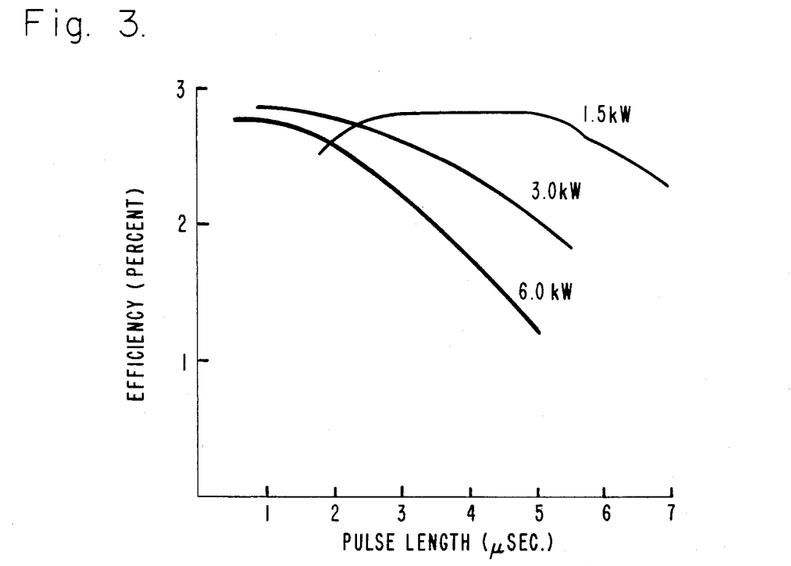
FIG. 3 is a graph illustrating chemical laser efficiency vs. pulse length and RF input power.
Figure 4:
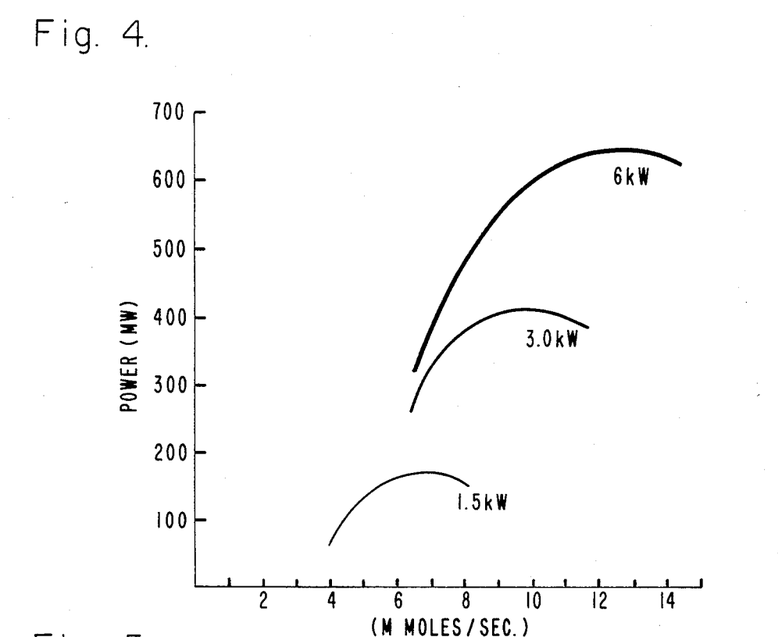
FIG. 4 is a graph illustrating chemical laser output power vs. transverse gas flow rate and RF power input power.

The improvement in the $3.8\mu$ DF system due to the increased replenishment rate of transverse flow configuration is shown in FIG. 2. An average electrical efficiency of 4.0% is maintained for both configurations at low repetition rates. Because of the difference of replenishment rates, as the repetition rate is increased, the conventional waveguide laser decreases in efficiency much more quickly than the transverse flow (TF) laser. A flow rate of 8.0 millimoles per second is used for the TF laser, while 3.2 millimoles per second is used in the waveguide laser. The input RF peak power was 1.5 Kwatt and the pulse length was maintained at $4\mu$ sec. The efficiency as a function of pulse length remains constant at low peak power, but begins falling off at higher power, as shown in FIG. 3. This is because $SF_6$ dissociation is approaching its maximum value at high power. Efficiency can be regained by varying the gas composition but will decrease eventually as the medium temperature increases significantly. By increasing the flow rate of the system and consequently the replenishment rate, the output power of the system increases. FIG. 4 shows the output power trend as the flow rate is increased for several cases. As the peak input power increases, the maximum power shifts toward higher flow rates. If larger peak input powers could have been reached as well as larger flow rates of the system, an average output power of approximately 5 watts could easily have been attained.

Even though the $2.7\mu$ HF system has not yet been tried in the TF laser of this invention, we anticipate a 5% electrical efficiency. Having achieved that efficiency in the waveguide configuration, it is reasonable to expect similar results in the transverse flow device, since no change occured in the $3.8\mu$ DF system.

B. CW $CO_2$ Laser

Figure 5:
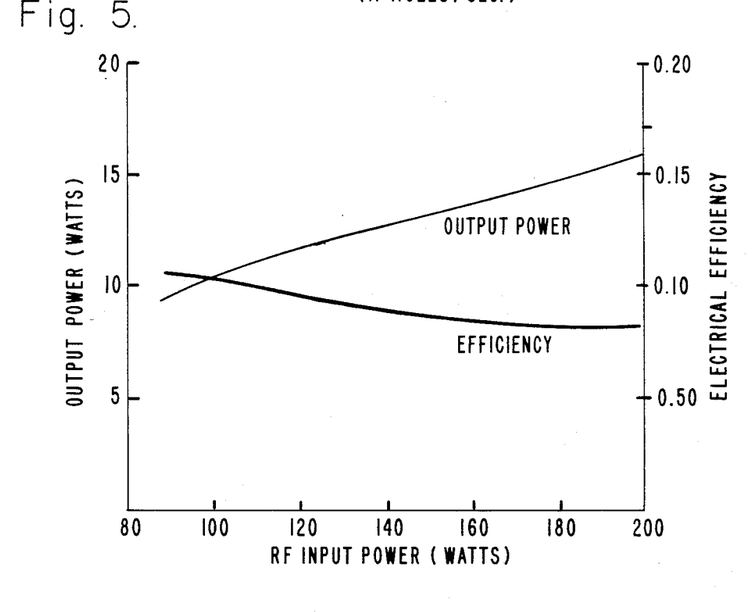
FIG. 5 is a graph illustrating CW $CO_2$ laser output power and electrical efficiency vs. RF input power.

For the CW $10.6\mu$ $CO_2$ system, a maximum output power of 16 watts with 8% electrical efficiency was demonstrated in this transverse flow device with RF input power of 200 watts. Approximately 40 watts of the input power was reflected back in the system; and, possibly with better impedance matching, the efficiency could increase. A maximum efficiency of 10% was achieved with input power of 100 watts. The transverse flow (TF) laser with a 20 cm gain length was utilized with a gas mixture $He:N_2:CO_2$ of 8:2:1. The discharge in the TF cavity 13 is uniform throughout the gain length. The output power of the system increases linearly with the input power as shown in FIG. 5. It is necessary to keep the lasant at a cool temperature for good efficiency. As the temperature increases, the population in the $\nu_2$ vibrational mode increases, which in turn increases the population in the (100) level, and the laser efficiency decreases. Improved cooling of the laser gas is provided by flowing gas. Small decreases in efficiency can be retrieved by optimizing the lasant mixture to allow for higher powers.

Figure 6:
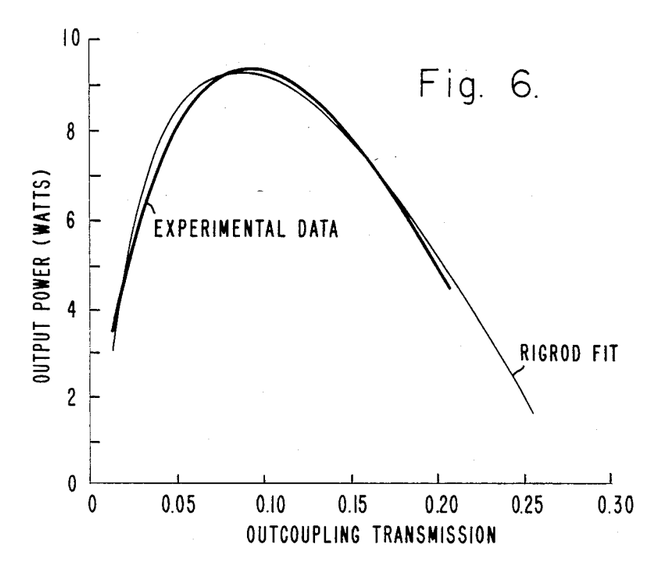
FIG. 6 is a graph illustrating the curve fitting of $CO_2$ laser data with the Rigrod Formula.

In order to establish the scaling information, an extensive laser characterization has been performed by measuring the laser output as a function of the outcoupling mirror transmittance. Key laser parameters can then be derived by curve fitting these data to a well-known Rigrod formula set forth in W. W. Rigrod, J. Appl. Phys., 36, 2487 (1965):

$$P_o = P_s \cdot \frac{T}{2} \left[ \frac{2g_o l + \ln(l - T - L)}{T + L} \right]$$

where $P_o$ is the outcoupled power, $P_s$ is the saturation parameter, $2g_o l$ is the roundtrip small signal gain, T is the outcoupling transmittance; and L is the roundtrip cavity loss which includes the attenuation along the gain medium, the coupling loss from the electrodes to the resonator mirrors and the scattered and the absorption losses in the mirrors. A series, of experimental data and curve fitting results for a constant 100 watts input power case are in FIG. 6. Assuming L is a constant, we have derived the following parameters:

$$2g_o l = 0.425$$

$$L = 0.07$$

$$P_s = 132 \text{ watts}$$

Figure 7:
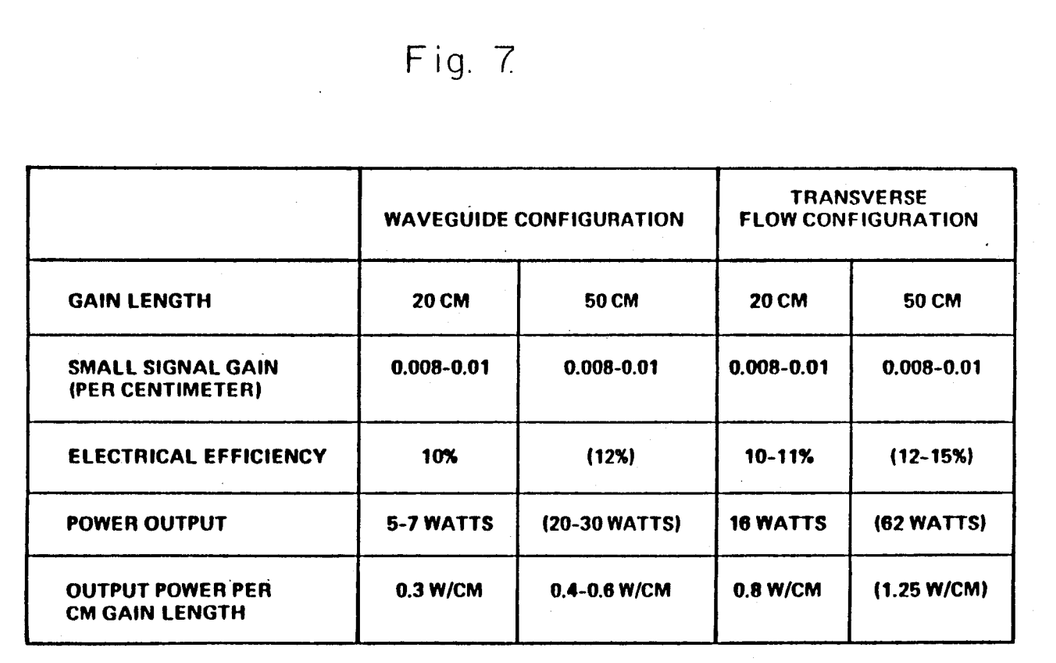
FIG. 7, is a chart tabulating RF-pumped CW $CO_2$ laser results and projections.

The derived small signal gain, $g_o = 1.06$ percent per centimeter is quite good. With these derived parameters, one can project the performance of a longer gain medium device as illustrated for a 50 cm gain length device, as well as results for the waveguide laser configuration in FIG. 7. Notice that a 60 watt laser output with 1.25 watt per centimeter gain length is expected in this 50 cm gain length device.

In addition to the CW $CO_2$ laser demonstrated, we also have achieved 1.5 watt average power in a 1 KHz pulsed $CO_2$ laser system with electrical efficiency between 10-15%. This performance is comparable to waveguide laser results because the heat transfer and cooling problems are not prevalent in the pulsed mode operation.

C. Summary of Results

A transverse gas flow laser has been demonstrated for use as both a pulsed $3.8\mu$ DF chemical laser and CW $10.6\mu$ $CO_2$ laser systems. An overall efficiency of 4.0% in the DF chemical laser has been extended to higher repetition rates and 0.6 watt average power has been achieved. Due to efficient gas medium and electrode cooling, a 16 watt $CO_2$ laser has been demonstrated with the capability of extending the device to 50 cm gain length with 60 watts output power. These devices represent a future for small infrared laser sources with high efficiencies.

What is claimed is:

1. An RF excited transverse discharge waveguide laser, comprising:

a pair of conductive electrodes having surfaces facing one another and defining a discharge region therebetween;

a laser gas medium at least partially confined in said laser discharge region between said two electrode surfaces;

means for coupling RF energy to said two electrodes in order to effect an electrical discharge in said laser gas in said discharge region;

a pair of optical elements facing one another and confining therebetween said two electrodes, said optical element pair defining therebetween a longitudinal direction through said discharge region;

means for flowing said laser gas medium in a direction transverse to said longitudinal direction through said discharge region so as to replenish said medium in said region; and a pair of electrode insulators disposed opposite one another along said longitudinal direction, each of said insulators having one of said electrodes set within such that said electrode surface is exposed upon an outer surface of said insulator, each of said insulators having a cross-sectional shape operable for defining a venturi-like region therebetween for providing an increased laser gas medium flow velocity through said discharge region.

2. The device of claim 1 wherein said medium consists of at least one of the following lasing gases: $CO_2$, HF, DF.

3. The device of claim 1 wherein said flowing means recirculates said gas medium through a chemical scrubber.

4. The device of claim 2 wherein said coupling means couples pulsed RF energy.

5. The device of claim 1 wherein said medium comprises $CO_2$ gas and said coupling means couples continuous wave RF energy.

* * * * *